(12) United States Patent
Green et al.

(10) Patent No.: US 8,137,720 B2
(45) Date of Patent: *Mar. 20, 2012

(54) LOW SUGAR PRESWEETENED COATED CEREALS AND METHOD OF PREPARATION

(75) Inventors: Daniel R. Green, Minnetonka, MN (US); Christine Nowakowski, Plymouth, MN (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 2103 days.

This patent is subject to a terminal disclaimer.

(21) Appl. No.: 11/114,453

(22) Filed: Apr. 26, 2005

(65) Prior Publication Data

US 2005/0266142 A1 Dec. 1, 2005

Related U.S. Application Data

(60) Provisional application No. 60/565,473, filed on Apr. 26, 2004.

(51) Int. Cl.
*A23L 1/216* (2006.01)

(52) U.S. Cl. ............ 426/94; 426/89; 426/548; 426/621

(58) Field of Classification Search .............. 426/89, 426/94, 548, 618, 619, 620, 621
See application file for complete search history.

(56) References Cited

U.S. PATENT DOCUMENTS

| | | | |
|---|---|---|---|
| 202,609 A | 4/1878 | Upton | |
| 1,161,323 A | 11/1915 | Martin | |
| 1,266,448 A | 5/1918 | Fukuda | |
| 3,246,990 A | 4/1966 | Thompson et al. | |
| 3,453,115 A | 7/1969 | Clausi et al. | |
| 3,464,827 A | 9/1969 | Tsuchyia et al. | |
| 3,484,250 A | 12/1969 | Vollink et al. | |
| 3,600,193 A | 8/1971 | Glabe et al. | |
| 3,615,676 A | 10/1971 | McKown et al. | |
| 3,687,687 A | 8/1972 | Liepa et al. | |
| 4,079,151 A * | 3/1978 | Schade et al. ............ | 426/96 |
| 4,089,984 A | 5/1978 | Gilbertson | |
| 4,211,800 A | 7/1980 | Scharschmidt et al. | |
| 4,378,377 A | 3/1983 | Gajewski | |
| 4,379,171 A | 4/1983 | Furda et al. | |
| 4,540,587 A | 9/1985 | Gajewski | |
| 4,608,263 A | 8/1986 | Bergin et al. | |
| 4,614,657 A * | 9/1986 | Sheng et al. ............ | 426/96 |
| 4,643,894 A * | 2/1987 | Porter et al. ............ | 424/479 |
| 4,734,290 A | 3/1988 | Meyer | |
| 4,738,865 A | 4/1988 | Morris | |
| 4,828,858 A | 5/1989 | Holloway et al. | |
| 4,849,233 A | 7/1989 | Hemker | |
| 4,853,235 A | 8/1989 | Tomomatsu | |
| 5,041,541 A | 8/1991 | Mazur | |
| D339,443 S | 9/1993 | Bielinski et al. | |
| D339,444 S | 9/1993 | Evenson et al. | |
| D341,469 S | 11/1993 | Evenson et al. | |
| 5,275,831 A | 1/1994 | Smith et al. | |
| D358,927 S | 6/1995 | Davis et al. | |
| 5,470,581 A | 11/1995 | Grillo et al. | |
| D368,791 S | 4/1996 | Laughlin | |
| D372,352 S | 8/1996 | Laughlin | |
| D373,671 S | 9/1996 | Laughlin et al. | |
| D384,785 S | 10/1997 | Laughlin | |
| 5,709,902 A | 1/1998 | Bartolomei et al. | |
| 5,747,091 A | 5/1998 | Denhartog et al. | |
| D403,485 S | 1/1999 | Clanton et al. | |
| 5,919,503 A | 7/1999 | Leusner | |
| 6,139,886 A | 10/2000 | Green et al. | |
| 6,143,342 A | 11/2000 | Weinstein et al. | |
| 6,149,965 A | 11/2000 | Van Lengerich et al. | |
| 6,174,553 B1 | 1/2001 | Cerda et al. | |
| 6,200,611 B1 | 3/2001 | Ganesan et al. | |
| 6,210,720 B1 | 4/2001 | Leusner et al. | |
| 6,391,374 B1 | 5/2002 | Gray et al. | |
| 6,468,561 B1 | 10/2002 | Grillo et al. | |
| 6,475,540 B1 | 11/2002 | Howling et al. | |
| 6,592,915 B1 | 7/2003 | Froseth et al. | |
| 2004/0115313 A1 | 6/2004 | Racicot et al. | |

FOREIGN PATENT DOCUMENTS

| | | |
|---|---|---|
| CA | 1168919 | 6/1984 |
| WO | WO 9423593 A1 * | 10/1994 |
| WO | 00/56175 | 9/2000 |
| WO | WO 00/54606 | 9/2000 |

OTHER PUBLICATIONS

Francis, F.J. 1999. Wiley Encyclopedia of Food Science and Technology. 2nd Edition. vols. 1-4. p. 2271. John Wiley & Sons.*

* cited by examiner

*Primary Examiner* — D Lawrence Tarazano
*Assistant Examiner* — Nikki H Dees
(74) *Attorney, Agent, or Firm* — Everett G. Diederiks, Jr.; John A. O'Toole

(57) ABSTRACT

A ready to eat breakfast cereal is prepared by coating dried cereal base pieces with a low sugar sweetener such as a high conversion maltodextrin or low conversion corn syrup that includes a high potency sweetener. The low sugar coating has a sugars content of less than 10% yet provides taste, texture, appearance and bowl life that mimics presweetened RTE cereals having a sucrose based coating.

11 Claims, No Drawings

LOW SUGAR PRESWEETENED COATED CEREALS AND METHOD OF PREPARATION

REFERENCE TO RELATED APPLICATIONS

This application claims the benefit of priority under 335 U.S.C. 119(e)(1) to provisional patent application, Ser. No. 60/565,473, filed Apr. 26, 2004, which is incorporated herein by reference in its entirety.

BACKGROUND OF THE INVENTION

The present invention relates to food products and to their methods of preparation. More particularly, the present invention relates to low sugar, pre-sweetened breakfast cereals and to their methods of preparation mimicking sugar coated pre-sweetened cereals.

Sugar coated pre-sweetened breakfast cereals have long been commercially available and popular packaged consumer food items. Such cereals have been prepared by first producing unsweetened cereal pieces, coating the cereal pieces with slurry comprising sucrose and/or other sugars and drying the coated pieces in an oven or air current.

Ready-to-eat ("R-T-E") or breakfast cereal pieces are typically prepared by cooking a cereal dough, shaping the dough into pellets or flakes and puffing or toasting the shaped dough. In other variations, pieces or cereal grains are cooked and puffed to form puffed cereal grain pieces such as puffed rice or puffed wheat.

One approach for preparing breakfast cereal flakes is disclosed in U.S. Pat. No. 1,161,323. A grain material such as corn grits is combined with salt, cane sugar and water. The combination is heated in a steam-tight cooker thereby cooking the grain material. The cooked grains are partially dried and then passed between spaced, smooth-surfaced flaking rolls. The resulting flakes are puffed by baking or roasting.

In other instances whole kernels of grain have been puffed to provide a breakfast cereal. U.S. Pat. No. 1,266,448 shows such a process in which rice kernels are soaked in water for approximately 36 hours. The kernels are then subjected to heat until the kernel surface is dried. The dried kernels are popped in a popper much like popcorn.

A further process for preparing ready-to-eat breakfast cereals is described in U.S. Pat. No. 3,453,115. Cereal dough is prepared from any of various cereals such as corn, wheat, barley, or oats. The dough is pressure cooked and pelletized. The pellets are partially dried to provide case hardening and then flaked between rolls.

The various ready-to-eat breakfast cereals have been sweetened by coating the finished cereal pieces with either noncrystalline sugar or crystalline sugar such as sucrose. One advantageous process for preparing a ready-to-eat pre-sweetened cereal is set forth in U.S. Pat. No. 3,615,676. The previous unsweetened cereals have had the disadvantage that table sugar, which is added to the cereal and milk mixture at the time of eating, in fact is added in excess and remains in the bottom of the cereal bowl after the cereal has been consumed. The pre-sweetened cereals overcome such disadvantage and provide an appropriate amount of sugar which is not wasted. The pre-sweetened coated cereals, however, have been limited to cereals having a sucrose sweetening agent.

A cereal presweetened with sweetening agents such as fructose that are normally in a liquid state such as high fructose corn syrup is disclosed in U.S. Pat. No. 4,089,984 "Sweet Coatings For Food Products" (issued to May 16, 1978 Gilbertson). Illustrative sweetening agents of this type are honey and/or high fructose corn syrup corn syrup. Since such liquid sweeteners result in a sticky coated product, such coatings are taught as essentially including a non sugar particulate dusting, to dehydrate to a solid non-adhesive state.

In still another example, fructose based sweet coatings for R-T-E cereals are described in U.S. Pat. No. 4,379,171 "Method For Preparing Food Products With Sweet Fructose Coatings" issued Apr. 5, 1983 to Furda et al. The coating contains a mixture of crystalline fructose and high fructose corn syrup.

Recent consumer interest has focused upon low sugar products including low sugar presweetened R-T-E cereals. Such products can be prepared by eliminating the sugars' components and presweetened such as with a topical coating including a high potency sweetener such as aspartame (See, for example, U.S. Pat. No. 4,378,377 "Cereal Presweetened with Aspartame and Method of Preparation" issued Mar. 29, 1983 to Gajewski that describes using a water soluble vegetable protein isolate as an adhesive to attach aspartame to the cereal pieces. Similarly, U.S. Pat. No. 4,540,587 "Cereal Presweetened with Aspartame and Cold Water Soluble Gum and Method of Preparation issued Sep. 10, 1985 to Gajewski describes using water soluble gums to help adhere the aspartame to the cereal pieces). Consumer oat based products prepared using these techniques have long been available commercially in Canada under the Pro Stars™ mark.

While popular, such low sugar products can suffer from the absence of certain physical and organoleptic attributes provided by the presence of sugar based pre-sweetener coatings. In particular, the products can lack the bite or crispness, surface sheen and bowl life in milk exhibited by sugar containing pre-sweetener coatings.

Given the state of the art as described above, there is a continuing need for improved low sugar pre-sweetener coatings and to coated comestibles prepared therewith especially dried food products such as R-T-E cereals and to their methods of preparation.

The present invention satisfies this need by providing pre-sweetener coating compositions comprising high conversion maltodextrin or low conversion corn syrups and a high potency sweetener(s) with low sugars levels, as well as low sugar presweetened comestibles topically coated with such coating compositions such as dried food product such as R-T-E cereals.

BRIEF SUMMARY OF THE INVENTION

In its product aspect, the present invention provides low sugar coating compositions comprising high conversion maltodextrin or low conversion corn syrups and a high potency sweetener(s). The high conversion maltodextrin or low conversion corn syrups can comprise about 80% to about 99.9% (dry basis) of the coating. The syrups are characterized by a dextrose equivalence ranging from about 5 to less than 40. The coating compositions comprise sufficient amounts of a high potency sweetener to provide the coating composition with a sweetness level at least 50% of sucrose (on an equivalent weight basis of coating) and can range from about 0.01% to 2% of the coating. The sugar(s) content of the coating is less than 10%. The moisture content can range from about 1% to 25%.

In another product aspect, the present invention resides in comestibles including the low sugar coating compositions as a topical coating or as a binder. The comestibles can include a food base and the low sugar coating composition in a weight ratio ranging from about 100:10 to about 100:150. The base can be a quantity of food pieces of one or more types such as dried food pieces fabricated from a cooked cereal dough. The coating is dried to a moisture content of less than 5%.

In its method of preparation aspect of one and the same invention, the present invention resides in methods of preparing low sugar presweetened coated comestibles, comprising the steps of:

A. providing a base of food pieces;
B. applying a low sugar coating composition as a coating or binder in a weight ratio of base to coating composition ranging from about 100:10 to about 100:150, said coating composition comprising a high conversion maltodextrin and/or low conversion corn syrup having a dextrose equivalent ranging from about 5 to less than 40 and at least one high potency sweetener and wherein the sugar(s) content of the coating composition is less than 10%; and,
C. drying the low sugar coating composition to a moisture content ranging from about 2-6%.

DETAILED DESCRIPTION OF THE INVENTION

The present invention relates to low sugar coating compositions comprising high conversion maltodextrin or low conversion corn syrups and at least one high potency sweetener(s), to comestibles including the low sugar coating compositions as a topical coating or as a binder, and to methods of preparing such comestibles. Each of these article components as well as methods of filling, product use and attributes are described in detail below Throughout the specification and claims, percentages are by weight and temperatures in degrees Fahrenheit unless otherwise indicated. Each of the referenced patents is incorporated herein by reference.

The present low sugar coating compositions comprise a high conversion maltodextrin or low conversion corn syrups and at least one high potency sweetener(s). The high conversion maltodextrin or low conversion corn syrups have a dextrose equivalency ("D.E.") ranging from about 5 to less than 40. Selection of such syrups insures that the level of sugars (mono- and disaccharides) is low. In preferred form, the average degree of polymerization ("D.P") of any such syrups is high and is at least three ("D.P$\geqq$3"). The skilled artisan will appreciate that these materials are to be distinguished from conventional corn syrups (typically 42 D.E) and/or high fructose corn syrups (having D.E. ranging from about 60-90). Also, sugars are mono or disaccharides having a D. P or one or two. Selection of such syrups or syrup solids is important to the realization of important finished property attributes at room temperature such as texture, appearance, and reduced hygroscopicity. Such materials are readily available commercially from such sources as Archer Daniels Midland Corp. Also, it will be appreciated that non fractionated corn syrups can have up to 20% by weight of such syrups of constituents having a D.P of 1-2. While less pure, such materials are much less expensive than pure fractionated syrups. Thus, such impure ingredients are not "no sugar" or "sugar free" but can be characterized as being "low sugar" ingredients.

While not wishing to be bound by the proposed theory, employment of the present low sugar syrups provides coatings having a glass transition temperatures ("$T_g$") above room temperature. If the coating is below its glass transition temperature, the coating is desirably more glassy or brittle rather than soft. While a soft texture might be desirable for certain food product applications (such as chewy granola bars), in the present preferred embodiment directed towards R-T-E cereals, a more crunchy texture is preferred by consumers. Provision of coatings having glass transition temperatures (i.e., about room temperature (i.e., below about 20° C.) is comparatively easy to formulate for sugar based coatings. However, providing a non sugar based coating having glassy textures at room temperature is more difficult. Since R-T-E cereals are consumed in a variety of climates and seasons, more preferred are those present coating compositions that can provide coatings to comestibles that have a $T_g$ of higher than about 25° C. and for best results at least 30° C. or higher.

The present syrups have a lower sweetness profile compared to sugar syrups due to their low levels or preferably absence of sugars. To provide desired levels of sweetness, the present coating compositions include sufficient amounts of supplemental or high potency sweeteners to provide a sweetness level at least 50% of a sucrose based sugar syrup (at equivalent use levels as a coating). Preferred herein for use for the provision of an R-T-E cereal are those syrups containing sufficient amounts of a high potency sweeteners to provide at least 75% of the sweetness level of a sucrose based sugars syrup and for best results at least an equivalent level of sweetness, i.e., at least 100% of a sweetness of a pure sucrose syrup. Since some syrup coatings in the past have additionally included sugars such as fructose having an even higher sweetness level per unit of weight than sucrose, even high levels of high potency sweetener can be used in the present low sugar or no sugar syrup based coatings. In contrast, in certain embodiments such as in the provision of coating or binder compositions for use in the fabrication of cereal bars where consumer complaints have been in respect of excessive sweetness for products previously prepared using conventional sugar syrups as a binder, less sweeteners may be desired and thus lesser amounts of high potency sweetener added to the present coating compositions.

Useful herein as high potency sweeteners are ingredients are aspartame, saccharin, Alitame, Cyclamate, potassium acetysulfame (or more commonly referred to as "potassium acetysulfame K" or even "AceK"), sucralose and mixtures thereof. Preferred for use herein are those high potency sweeteners that are stable upon extended storage and are also heat stable including sucralose and potassium acetysulfame and mixtures thereof. National food regulations restrict employment of particular high potency ingredients in respect of particular food product applications and usage levels and selection of ingredients will also be driven by such regulatory restrictions. From time to time, additional high potency sweeteners may be developed or approved and those to-be-developed sweeteners, especially those thermally stable, are contemplated for use herein. The present coating compositions can comprise about 0.01% to about 2% of the coating of the high potency sweetener(s).

In less preferred variations, the present coating compositions can additionally include small quantities of sugars to enhance the processing or ease of application or other properties of coating composition. In preferred form, the total sugar(s) content of the coating composition is 10% or less, preferably about 5% or less and in most preferred form is 1% or less.

If desired the coating composition can further comprise about 1% to about 15% of a humectant, preferably about 1% to about 10%. Humectant addition is useful in moderating texture properties. The humectant can be any commonly employed humectants ingredient. Preferred humectants are selected from the group consisting of sorbitol, xylitol, mannitol, glycerin, glycerol, propylene glycol and mixtures thereof. Preferred for use herein is a mixture of, propylene glycol and glycerin or, more preferably, glycerin by itself.

If desired, the coating compositions can additionally include a variety of adjuvant materials to enhance the color, taste, appearance, or nutritional properties of the coatings. Such adjuvant ingredients can include, for example, sugar(s), minerals, vitamins, colorants, preservatives and flavors. If present, each of these constituents can comprise from about 0.01 to about 2% (or more for sugar, cheese solids) by weight of the coating. In particular, flavors such as fruit flavors, chocolate or cocoa powder, cinnamon, vanilla, and mixtures thereof are especially preferred. Since the present coatings form glassy or shiny coatings, for those products for which a frosted appearance is desired, the coating can additionally include a matting agent such as $TiO_2$. In still other variations especially for children's cereal products, the ingredients can include a calcium ingredient especially a calcium phosphate salt for calcium fortification. In preferred variations, the flavors can include such flavors as fruit flavors, cinnamon, vanilla chocolate, peanut butter and mixtures thereof.

The moisture content of the coating composition can range from about 1% to 25%. In one variation, the coating compositions are provided in form of a slurry or syrup as a useful intermediate product in the provision of coated R-T-E cereals, for example, and comprise about 15% to 25%, preferably about 15-20% moisture. In other variations, the coating compositions are provided in dry form such as a granular or powder form having a moisture content ranging from about 1% to about 5%.

| Ingredient | Weight % (dry) | Preferred | Most Preferred |
|---|---|---|---|
| High conversion maltodextrin or low conversion corn syrup | 55%-99.9% | 85%-95% | 85%-90% |
| High potency sweetener Sugar alcohol (e.g., glycerin) | 0.01%-2% | 0.1-1.5% | 0.5%-1.5% |
| | 0-15% | 1%-15% | 5%-12% |
| Sugar (s | ≦10% | ≦5% | ≦1% |
| Triglyceride | 0-40% | 0-10% | ≧10% |

In another product aspect, the present invention provides coated comestibles comprising a base food piece having a topical coating or binder provided by the present coating compositions.

The base can be one of more food piece that are beneficially coated or combined with the present coating compositions. The food pieces could be of any food type which is desired to be provided with a sweetened coating and include, for example, puffed popcorn or other grains, nuts, candies, and the like. The present methods find particular utility in providing R-T-E cereals with a presweetened coating. In particular, the base can be one or more common shapes and sized pieces of R-T-E cereals whether, flakes, puffs, shreds, biscuits, O's, and mixtures thereof fabricated from a cooked cereal dough. The R-T-E cereal can also be in the form of puffed pieces of wheat, rice, corn, etc. In preferred form, the pieces are dried food pieces having a moisture content of about 1-5%. In other variations, the base can be in the form of puffed or unpuffed pieces. An example of a puffed piece is popped popcorn. An example of an unpuffed (but possibly leavened) base piece is a cookie or biscuit. In the following detailed description of the present invention, even though particular reference is made to a base comprising R-T-E cereal, it is understood that the present invention also finds wide application in provision of other food items wherein providing a pre-sweetener coating is desired.

The cereal pieces or base can be of any geometric configuration or form including, for example, flakes or puffs, shreds, biscuits, squares, mini biscuits or the like. The present invention finds particular utility in the coating of puffed cereals. Such cereal particles are prepared in the usual manner and may be either toasted or untoasted.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabel, et al.); U.S. Pat. No. 3,246,990, (issued Apr. 19, 1966 to Thompson, et al.); and U.S. Pat. No. 3,687,687, (issued Aug. 29, 1972 to A. L. Liepa), each of which is incorporated herein by reference.

Particularly useful herein are smooth puffed pieces such as puff base or in spherical shaped pieces. Such pieces can be fabricated from cooked cereal doughs containing, barley corn (maize), oats, rice, wheat, and mixtures thereof and blends of such pieces. Minor cereal grains such as amaranth, triticale and the like are also known and can be used. The present invention finds particular suitability for use in connection with spherically shaped puffed pieces fabricated from corn based cooked cereal doughs. The present application also finds particular suitability for use in connection with complexly shaped puffed pieces fabricated from corn based cooked cereal doughs as well as. More particularly, the present invention finds suitability for those fruit flavored and nonflavored topically presweetened R-T-E cereal products sold under the Cocoa Puffs™, Trix™ and Kix™ brand names.

Of course, mixtures of various base pieces are contemplated. For example, a mixture of two ore more cereal flavors and/or shapes or sizes. Also, the base can include other pieces such as nuts or nut pieces or flaked grains such as oatmeal flakes. In still other variations, the base can include small pretzel shapes. In still other variations, the base can be in the form of an undried baked good or sweet good such as a doughnut (whether yeast raised or chemically leavened). In still other variations, the base can be candy pieces such as small licorice strands. In still other variations, the base can be provided by cooked cereal dough pieces typically shaped and sized for snacks especially corn based pieces such as the cornucopia shaped pieces described in US design 202,609 "Puffed Snack Food Product (issued Oct. 26, 1965 to Weis et al.; (or the shapes described in UDS 339,443; UDS 339,444; UDS 341,469; UDS 368,791; UDS 372,352; UDS 373,671; UDS 384,785; or USD 403,485) or that puffed triangular pillow design described in U.K. design No 2012722 "Snack Food Product" registered 2 Aug. 1991 to General Mills, Inc. In still other variations, the base can be peanuts, cashews, walnuts, almonds, or other nuts In preferred variations, the base pieces themselves are low in sugar content preferably under 15% by weight of the base of sugar(s), more preferably less than 10% total sugars in the base and for best results less than 2% sugars. If desired, the base pieces themselves can be sweetened by inclusion of high potency sweeteners.

The size of the base can range from about pellet count for a typical R-T-E cereal will be in the range of about 35 to 65 pieces per 10 grams to larger sized snack food pieces ranging from about 1-5 pieces per 10.

The ratio of base can range from about 100:5 base to coating wherein the base is predominant to about 100:150 with more coating than base. Preferred for use herein for the provision of R-T-E cereals or cereal bars is a ratio of base to coating ranging from about 10:3 to about 10:6.

In preferred form, the coated comestible products of the present invention are in the form of a free flowing or aggregated mixture of individually coated pieces typically of presweetened coated R-T-E cereal products. In preferred form, the entire piece is coated with the present coating. In certain variations, however, such as shred biscuits or flat squares, only one surface such as on of two major oppose planar surfaces can be provided with the coating although preferably the entire surface is coated.

It is an advantage of the present invention that since the present coating compositions form glassy non sticky coatings at room temperature, particulate materials needed to make a sticky coating non tacky such as are described as essential in the '984 patent to Gilberson can be and preferably are not included as part of the coating.

In still other variations, the coated products can be formed into agglomerated pieces or clusters and even into masses than can be formed into bar products. (see for example, the popcorn bars described in USD 358,927 "Food Product" issued Jun. 6, 1995 to Davies et al. or the uncompressed multilayered cereal bars described in U.S. Pat. No. 6,592,915 "Layered Cereal Bar and Their methods of Manufacture" issued Jul. 15, 2003 to Froseth et al.). In particular, the present coating compositions can be used to fabricate all manner of crispy food bars especially compressed or uncompressed cereal bars and granola bars. In these bar embodiments, the base ratio to binder or coating layer can range from about 10:3 to about 10:5 (dry weight basis).

The present coated comestible products provided texture taste and appearance, and eating qualities comparable to those R-T-E cereal products presweetened with a convention sugar, especially sucrose, based coatings even though being low in sugars. The products can be conventionally packaged such as in cartons with interior bag liners for distribution and sale. However, since the present coating can exhibit hygroscopicity, in preferred embodiments, unlike conventional R-T-E cereals that are typically packaged in packaging having some capacity to loose and gain air (to facilitate shipping to and from high altitudes), the finished products are packaged in imperforate moisture barrier food packaging.

In certain variations, the coating can additionally include a particulate dusting. The dusting ingredient is likewise desirably a low sugar material. Especially useful is a powdered maltodextrin. The maltodextrin can be applied along with the liquid low sugar coating or immediately after applying the low heated low sugar material (i.e., before being cooled to below cooling to solid temperatures. If present, the maltodextrin can range in a weight ratio of base to dusting from about 100:1 to about 100:30, preferably about 100:5 to 100:15. Of coarse, higher dusting ingredient levels can be associated with higher levels of the coating, In its method of preparation aspect, the present invention comprises a step of providing a base of food such as feeding the food pieces to or charging to an enrober.

Prior to application of the pre-sweetener coating, the R-T-E cereal base pieces themselves typically will have a native or intrinsic density ranging from about 0.15 to 0.5 g/cc, preferably about 0.2 to 0.3 g/cc. Due to the various shapes and their packing factors, the bulk densities of quantities of the base prior to coating will range from about 0.05 to 0.25 g/cc.

In certain variations, the base can comprise and be prepared from cooked cereal dough having a little or no calcium content. For example, the cooked cereal base can comprise expanded pieces such as are prepared by direct expansion from an extruder. In certain particular variations, the expanded cereal pieces can be characterized as having a complex shape such as in those pieces depicted in Des 339,443 and 339,444. By complex shape is meant those shapes intended to resemble for example a shaped object such as a figurine, an animal, a vehicle, and a fruit. In certain variations, such cereal base pieces are not uniformly colored but rather are characterized by portions being of more than one color. For example, a pieces intended to be reminiscent of a raspberry can have one or more portions each of red or blue.

In certain variations, the cereal base can contain low levels calcium material for calcium fortification, e.g., up to about 0.005%-1.3% dry weight of calcium such as supplied by calcium carbonate, dicalcium phosphate and/or tricalcium phosphate. In particular, such cereal bases can also be puffed (i.e., having a density of 0.15 to 0.3 g/cc and weighing about 0.1 to 3 g). Such puffed cereal bases containing bases are conveniently in the form of simple to form shapes such as spheres, shreds, flakes, squares, biscuits, and mixtures thereof.

For those food products requiring low moisture contents, i.e., wherein the base is supplied in the form of dried food pieces, all or a portion of the drying operation of the base can performed prior to the coating of the pre-sweetener coating. Typically, for example, puffed cereal bases must be dried to relatively low moisture contents in order to have the desired crispness or frangibility. Thus, when a puffed cereal is the food base in the present methods of preparation, it is preferable to dry the puffed cereal base pieces to a moisture content of less than about 4%, and preferably less than about 3%, prior to the application of the pre-sweetener coating.

Any conventional drying technique can be used to reduce the moisture content of the cereal base pieces. The drying can be accomplished using equipment such as a rotary bed, tray, or belt dryers. Simple hot air convection drying, e.g., 200° F. to 280° F. (93.3° C. to 137.8° C.), is the preferred technique for practicing the present cereal piece drying. Of course, in certain applications, e.g., the provision of puffed cooked cereal dough pieces by direct expansion from a cooker extruder, the moisture content may be of suitable range without the need for a separate drying step.

The present method of preparation can comprise the step of to coating or to enrobing base pieces such as the dried cereal pieces with the present low sugar coating compositions presweetener coating. In a preferred embodiment, the coating is applied in the form of a hot syrup or slurry. said slurry being at a temperature of 200° F. to 300° F. and containing 5 to 25% by weight water and 80 to 95% by weight solids The slurry in preferred form is provided at a moisture content more preferably ranging from about 5% -10% moisture. At such concentrations, the slurry exhibits a thick viscous property at room temperature. The slurry can be heated to thin to facilitate coating. The low sugar slurry can be applied at temperatures more preferably ranging from about 200° F. to about 260° F. (95° C. to about 127° C.), even more preferably about 230° F. to about 250° F. (110° C. to about 121° C.). The admixture can be mixed such as in an enrober to facilitate coating.

If a "frosted" appearance for the coating is desired (as compared with a clear or glossy coating appearance), then a frosted appearance can also be provided by adding, and in preferred embodiments, the coating composition additionally comprises, small amounts of titanium dioxide ($TiO_2$). Suitable $TiO_2$ concentrations range from about 0.02% to about 0.5% of the coating composition. Addition of a powdered white pigment is preferred to addition of a crystalline sugar or other sugar manipulation so as to provide not only a pleasing initial frosted appearance but also the benefits of resistance to dissolution in milk as well as a low sugar content. Indeed, in highly preferred variations, addition of crystalline sugar to the enrober is avoided during the coating step.

In certain variations, the present coated products can include fruit flavors. For such products, the topical coating solution can optionally and preferably further comprise minor levels an edible organic flavor enhancer suitable for as the edible organic acid is ascorbic acid, malic acid, tartaric acid, citric acid and mixtures thereof. Employment levels can be adjusted upwards to accommodate modest "neutralization" of the acidulant by the calcium ingredient (if used). Useful collective levels of such acids can range from about 0.001 to 0.0025% (dry weight), preferably about 0.0012 to 0.0018%.

Any one or more of these coating supplemental ingredients can be conveniently added in the form of a sub-stream. For example, heat sensitive materials such as certain vitamins can be added in a sub-stream. If desired, the vitamin sub-stream can additionally contain heat sensitive flavors, e.g. fruit flavors. The sub-stream can also serve as a convenient technique for adding flavor acids such as malic, citric, or acid blends.

The coating solution is preferably being introduced as a fine spray. Spray nozzles having the desired spray producing characteristics are commercially available and will not be described in detail.

Any conventional enrobing apparatus and technique can be used to practice the present enrobing or application step. Generally, a useful technique involves tumbling. The comestible piece(s) and aqueous suspension are each charged in any order to a rotating drum and tumbled for a sufficient time to achieve an even distribution of the suspension on the comestible. Preferably, the aqueous suspension is added after the comestible has been added to the drum. Another useful technique is simply spraying the aqueous solution over those comestibles, which are desirably not tumbled due to the shape, frangibility, etc.

In another variation, particulate matter, as compared to powdered, can be added to the enrober for adhering the particulate matter to the external surface of the R-T-E cereal pieces. Particulate matter can be 0.5-4 mm, preferably about 0.5 to 2 mm, and can include fruit pieces, granola, seed bits, candy bits, and mixtures thereof. The particulate material upon finish drying of the R-T-E cereal adheres to the external surface due to the coating action of the sugar slurry. Particulate matter can be added in a weight ratio of particulate matter to cereal base ranging from about 1:100 to about 25:100, preferably about 5:100 to about 15:100.

Desirably, the finished cereal base coated with the pre-sweetener coating is at moisture contents ranging from about 1% to 5% to provide shelf stable storage. Conventionally, the coated base having been coated with a pre-sweetener coating is subjected to a drying step, and the present methods can comprise such drying step, in a drier for times sufficient to reduce the moisture content to such desirable levels. The drying step functions to remove the moisture added with the pre-sweetener coating.

In certain embodiments, however, the pre-sweetener coating can be at sufficiently low moisture content (i.e., under 5% moisture) such that post coating application drying is minimal or even unnecessary.

The finished product is characterized by a thin (i.e., about 20 to 40 microns in thickness) low sugar pre-sweetener coating.

If desired, the dried R-T-E cereal pieces can be thereafter fortified with an exterior or topical application of heat sensitive vitamins. A vitamin(s) dispersion is topically added to the cereal base such as by tumbling to form a vitamin fortified finished presweetened R-T-E cereal. Of course, the topical application of beta carotene is less preferred for the stability and appearance concerns discussed herein. Vitamin C beta carotene and other heat labile vitamins can optionally be sprayed onto the cereal pieces after the drying step.

After finish drying, the sugar coated pieces; optionally vitamin fortified, are allowed to cool to ambient temperature and then subsequently packaged and distributed in conventional manner. No further drying is required since the amount of added moisture from topical vitamin application is small. In preferred variations, due to the hygroscopicity of the coating, the dried finished coated pieces are maintained in low relative humidity conditions (relative humidity of less than 40%) prior to packaging in moisture barrier packaging. In one variation, the finished low sugar coated cereal pieces are in the form of a loose free flowing mixture of individual pieces. If desired, the cereal product so formed can be admixed with dried fruit pieces, nut pieces, cluster, dried marshmallow confections and the like. In another variation, the low sugar coated pieces can be formed in cereal bars. For example, while still warm, the coated pieces can be form into a formable or plastic mass, optionally compressed, and shaped into a formed mass such as a slab or ribbon. The mass can be allowed to cool to such as to room temperatures and solidify into a mat or slab and then cut or sectioned into individual cereal bar pieces.

Due to the hygroscopic nature of the present low sugar sweetened coated cereal products herein, the products are preferably packaged in moisture proof or at least moisture resistant food packaging.

By "low sugar" is meant that the coating has less than about 10% of the coating mono- and disaccharides. In a preferred variation, the coated comestible is also low sugar, i.e., having a total sugars content (from the coating, base and added ingredients) of less than 10%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for preparing a pre-sweetened comestible, comprising the steps of:
    A. providing a base of food pieces, wherein the base includes low sugar dried food pieces;
    B. applying a low sugar coating composition as a coating or binder to the base in a weight ratio of base to coating composition ranging from about 100:5 to about 100:150 to provide a low sugar coated base, said coating composition cormprising:
        80-99.9% by dry weight of a high conversion maltodextrin and/or low conversion corn syrup having a dextrose equivalent ranging from about 5 to less than 40 and an average degree of polymerization of at least 3;
        0.01-2% by weight of at least one high potency sweetener;
        a sugar(s) content of less than 10% by weight; and
        about 1-15% by weight of a humectant, wherein the coating composition is applied in the form of a liquid slurry having a temperature ranging from about 95 to 150° C. and a moisture content ranging from about 5-10% by weight; and,
    C. drying the low sugar coated base to a moisture content ranging from about 1-6% by weight, wherein the low sugar coated base includes at least one particulate, said particulate ranging in size from about 0.5 to 4 mm.

2. The method of claim 1 wherein the drying step is practiced to form a loose aggregation of individual coated pieces.

3. The method of claim 2 wherein the base includes at least one non cereal piece member.

4. The method of claim 1 wherein the ratio of base to low sugar coating composition ranges from about 100:30 to about 100:50 (dry weight basis).

5. The method of claim 1 additionally comprising the step of packaging the coated comestible in an imperforate moisture barrier packaging.

6. A sweetened dry coated comestible, comprising:
about 40% to 95% by weight of a base of food pieces; and
from about 5 to 60% by weight of a coating on at least a portion of the base pieces, said coating including:
from about 0.01 to 2% by weight of a high potency sweetener;
80-99.9% of a high conversion maltodextrin or low conversion corn syrup having a dextrose equivalence ranging from about 5-less than 40 and a degree of polymerization of at least 3; and
about 1-15% by weight of a humectant, wherein the coating is a glassy, non-sticky coating at room temperature.

7. The comestible of claim 6 wherein the at least a portion of the comestible base is a puffed R-T-E cereal base.

8. The comestible of claim 6 wherein the coating has a $T_g$ of at least 20° C.

9. The comestible of claim 6 wherein the coating additionally comprises a fruit flavor and an edible organic acid.

10. The comestible of claim 9 wherein the coating comprises about 0.001 to 0.0025% dry weight of an edible organic acid selected from the group consisting of ascorbic acid, malic acid, citric acid, tartaric acid and mixtures thereof.

11. The comestible of claim 8 in the form of a square or bar.

\* \* \* \* \*